United States Patent [19]

Hoover

[11] Patent Number: 5,292,102

[45] Date of Patent: Mar. 8, 1994

[54] MOUNTING BRACKETS FOR BOATS

[76] Inventor: Robert J. Hoover, 106 Bluebird La., Spartanburg, S.C. 29303

[21] Appl. No.: 782,541

[22] Filed: Oct. 25, 1991

[51] Int. Cl.$^5$ ............................................. A01K 97/10
[52] U.S. Cl. ................................. 248/539; 248/229; 248/231.4
[58] Field of Search .................. 248/539, 540, 205.1, 248/231.4, 231.6, 225.31, 301, 235, 236, 229

[56] References Cited

U.S. PATENT DOCUMENTS

| 711,622 | 10/1902 | Fergasson | 248/231.4 |
|---|---|---|---|
| 2,649,142 | 8/1953 | New | 248/231.4 X |
| 2,753,439 | 7/1956 | Greenfield | 248/539 X |
| 2,972,007 | 2/1961 | Zoeller | 248/231.4 X |
| 3,100,241 | 8/1963 | Goldstein | 248/225.31 X |
| 3,804,359 | 4/1974 | Cumber | 248/225.31 X |
| 3,984,076 | 10/1976 | Van Ordt | 248/539 |
| 4,372,481 | 2/1983 | Benson | 248/539 |
| 4,856,744 | 8/1989 | Frankel | 248/301 X |
| 5,141,192 | 8/1992 | Adams | 248/301 X |

Primary Examiner—Blair M. Johnson
Attorney, Agent, or Firm—Dority & Manning

[57] ABSTRACT

A mounting bracket for removable securement to a portion of a boat for receipt of an accessory such as a rod holder, a lantern holder, or trolling motor holder or the like. The bracket is removably securable to a gunnel and may be moved along the length of the gunnel.

4 Claims, 1 Drawing Sheet

MOUNTING BRACKETS FOR BOATS

BACKGROUND OF THE INVENTION

The present invention relates to a mounting bracket for installation on boats to permit various and sundry items to be removably secured to the boat for use by persons in the boat.

Leisure boats are frequently used by the owners for multiple purposes such as, for example, fishing, pleasure riding, towing skis and the like. Obviously, in such varied environs, various accessories may be desirably applied temporarily to the boat to facilitate fishing or other needs, though primarily fishing. It is likewise important to be able to readily remove such items from the boat when not needed and when the boat is to be used for other than fishing.

Accessories as generally set forth above include many items that are used routinely in fishing such as, for example, rod holders, trolling motor supports, lantern holders for night fishing, and the like. These and many other items are useful in the fishing operation to ease the burdens of the fishermen and/or to facilitate an improved fishing experience. By way of example, when night fishing, it is desirable, if not necessary, that some sort of an arrangement be provided from which a lantern or light can be suspended over the water to either attract fish or to afford light by which the fisherman can more readily bait a hook, remove a fish, net a fish, or the like. Such a device is taught in my U.S. Pat. No. Des. 285,124.

In a fishing mode, boats are frequently equipped with small trolling motors for use after the boat has reached a particular location where a slow speed trolling operation is to be achieved. Normally, the boat would be equipped with a primary, larger motor for driving the boat on the body of water, and with a smaller trolling motor mounted forward along one side of the boat to be used in the slow speed, trolling operation. In instances when the trolling motor is not needed, due to its mounting structure, it may be pivoted upwardly out of the water and maintained on the boat. In such instances, it is desirable to provide a further support for an end of the motor which will hold the end of the motor off of the transom, etc. of the boat and will alleviate vibration of the motor which could be experienced during normal movement of the boat. An example of such a mount for a trolling motor is set forth in my U.S Design application, Ser. No. 07/513,196, filed Apr. 23, 1990.

Likewise, in certain types of fishing, it is desirable, once the line is cast to simply secure the rod to the boat, leaving same unattended until a fish strikes. Rod holders, therefore, not only enable the fisherman to go about other duties while awaiting a strike, but also permits the use of multiple rods by a single fisherman. An example of such a rod holder is set forth in my U.S. Pat. No. Des. 283,909. Likewise there are various and sundry other items that may be necwssary or desirable for mounting on a fishing or pleasure craft to achieve a particular end.

With each of the items mentioned above, it is desirable that each be capable of removable securement to the boat. Such permits the items to be taken off and stored during transport of the boat to and from the body of water as well as use of the boat on the water for pleasurable activities where the items if mounted to the boat could interfere with the activities, pose safety hazards, and the like. Each of the items is thus desirably removably mounted to the gunnel or gunwale of a boat so as to be easily placed in position for intended use and easily removed after such use.

Various and sundry types of devices and techniques have been employed for the removable securement of accessories to a boat. In some instances, the gunwale of the boat is adapted during or after manufacture so that accessories of the types noted above may be removably secured thereto. By way of example, prior attempts include the permanent securement by bolting, adhesives, implanting, and the like of mounting brackets to the gunwale of a boat or a portion thereof such that the appurtenances may be removably secured thereto. My prior U.S. Pat. No. Des. 301,383 illustrates such a permanent mounting bracket. While this bracket is excellent for its intended purpose, in any instance where the mounting bracket is permanently secured to the gunwale of the boat, not only is the user restricted in placement of the accessory, but also in a non-fishing or non-intended environment, the mounting brackets remain visible, and become an extraneous device along the general run of the gunwale which could be inadvertently contacted by occupants of the boat.

The mounting bracket according to the present invention overcomes certain of the problems discussed above in that not only is it removable from the boat along with the accessory to be mounted thereon, but likewise the bracket may be moved along the gunwale of the boat to a location as desired and secured there for the particular use of the accessory. The mounting bracket according to the present invention is particularly useful with a boat that has a caprail on the gunwale as depicted in FIG. 1. By way of example, such a device is provided on Dura Craft boats though the caprail type structure does not per se form a part of the present invention.

Moreover, while the Dura Craft boats may be obtained with accessories that mount along the gunwale and interrelate with the caprail such as a trolling motor bracket, such structures neither anticipate nor suggest the mounting bracket of the present invention. Likewise no other prior art is known which teaches or suggests the mounting bracket of the present invention.

SUMMARY OF THE INVENTION

It is an object of the present invention to provide an improved mounting bracket for use with a boat for the removable receipt of various accessories thereto.

Another object of the present invention is to provide an improved mounting bracket for use with a boat that has a caprail along the gunwale.

Still further another object of the present invention is to provide a mounting bracket for a boat for the removable receipt of an accessory where the mounting bracket may be adjustably located along the length of the boat at a desired location.

Yet a further object of the present invention is to provide an improved mounting bracket for a boat.

Generally speaking, the present invention relates to a mounting bracket for a boat, said bracket comprising an elongated, arcuate member, said member having a first end, a second end, and top and bottom surfaces, one of said ends of said member defining means for locking receipt about a portion of a boat onto which said bracket is to be mounted, an opposite end of said member defining an opening therethrough for receipt of a locking means, said member further having means secured thereto on a top surface thereof and intermediate the length thereof for receipt of an item to be mounted to said boat; and locking means associated with said member for removably locking said bracket to said boat.

More specifically, the mounting bracket according to the present invention is particularly adapted for use in conjunction with a boat equipped with a caprail or other suitable structure along at least a portion of the gunwale to which the mounting bracket may be easily secured and removed. Preferably, the mounting bracket, is an elongated arcuate body member on which the means to be received about a portion of the gunwale is a lip. The lip is located at one end of the member and with locking means located at an opposite end. In this embodiment, the lip is located at the end of the arcuate configuration and is adapted to engage the caprail or other structure to secure one end of the mounting bracket to the boat while the other end is provided with a locking means that is removably securable to a portion of the gunwale, particularly a rail along the top of the gunwale, to removably secure the mounting bracket to the boat. The remainder of the arcuate configuration is preferably adapted to follow the overall contour of the upper edge of the gunwale or gunwale rail. Located atop the mounting bracket generally inermediate the arcuate portion is a receiving means for accessories to be mounted. Preferably, the receiving means is a protuberance having an internally threaded opening thereinto, with the protruberance being secured to a portion of the top surface of the mounting bracket such as by welding. An accessory for use with the boat may then be provided with a threaded outer free edge which is matably receivable within the receiving means opening in threaded connection therewith for ease of removal. In a most preferred embodiment, the locking means is a elongated element having a curved free end which is located on the underside of the mounting bracket for engagement with a portion of the gunwale and with an upper threaded end having a nut or the like in threaded arrangement therewith. Tightening of the nut will bias the mounting bracket against the force of the curved end that engages the gunwale rail, and therefore secure the mounting bracket to the boat, but for easy removal therefrom.

BRIEF DESCRIPTION OF THE FIGURES

The invention will be more readily understood from a reading of the following specification and by reference to the accompanying drawings forming a part thereof, wherein an example of the invention is shown and wherein.

DESCRIPTION OF PREFERRED EMBODIMENTS

Making reference to the figures, preferred embodiments of the present invention will now be described in detail.

Figure 1:
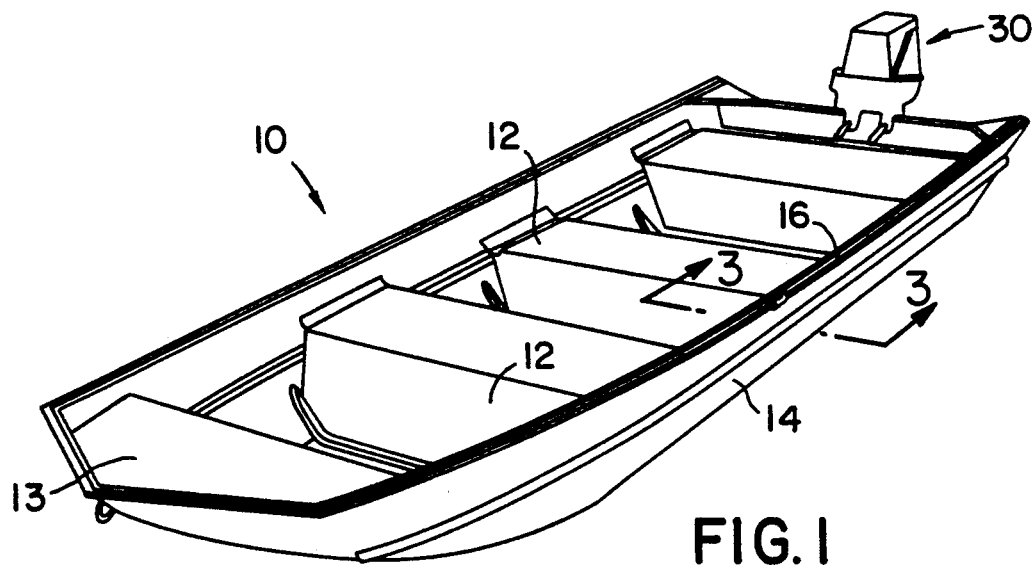
FIG. 1 is an isometric view of a boat, exemplified by a fishing boat which has one example of a gunwale rail and caprail assembly of a type to which a mounting bracket according to the present invention may be secured.

FIG. 1 is a general illustration of a boat that is of a generally preferred type to which a mounting bracket according to the present invention may be secured.

Figure 2:
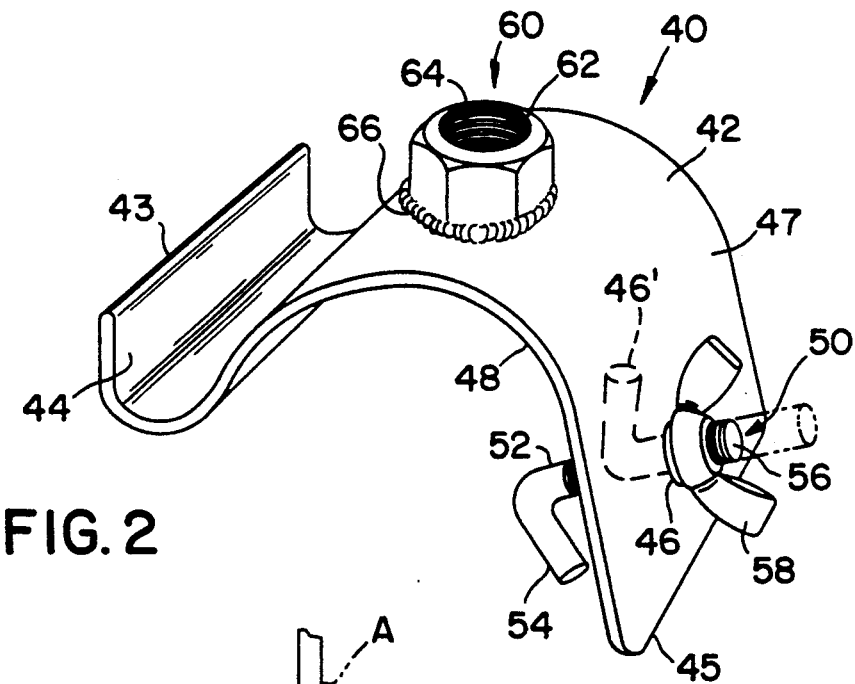
FIG. 2 is an isometric view of a preferred embodiment of a mounting bracket according to the present invention.
Figure 3:
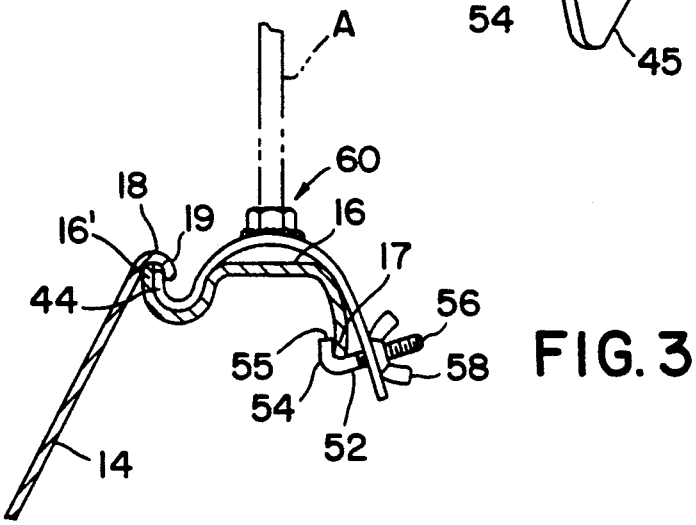
FIG. 3 is a cross-sectional view of the boat of FIG. 1 taken along line 3—3 showing a mounting bracket of the type as illustrated in FIG. 2 secured in place thereto.

In FIG. 1, a boat generally indicated as 10, is illustrated, which is exemplary of the general type of boat with which a mounting bracket according to the present invention may be employed and which is generally indicated as 40 in FIG. 2. Boat 10 is constructed in normal fashion to define a hull which includes gunwales 14 and with a plurality of separate seats 12 spaced apart along the length of boat 10 and terminating at an forward end in a transom 13. Gunnel or gunwale 14 extends along the length of boat 10 and terminates at its upper end in a top rail 16 which has a caprail 18 forming a part thereof (see FIG. 3). Caprail 18 may be an independent part that is secured to a top rail 16 as best illustrated in FIG. 3, or may have other configurations.

As mentioned hereinbefore, mounting bracket 40 according to the present invention is most advantageously employed in a fashion so as to permit same to be utilized along the full length of gunnel 14. Thus a fisherman or other user may deploy a desired accessory anywhere along the length of the boat. Referring to FIG. 2, a preferred embodiment of the mounting bracket according to the present invention is illustrated as including an elongated, generally arcuate body member 42. The arcuate curvature of body member 42 is not per se critical to the present invention, though preferably is provided so as to at least generally follow the contour of top rail 16. Body member 42 has a first end 43, a second end 45 and top and bottom surfaces 47 and 48, respectively.

Body member 42 of mounting bracket 40 defines a lip 44 at end 43 (the purpose of which will be described hereinafter) and a locking member receiving opening 46 adjacent an opposite end 45 thereof. A locking member generally indicated as 50 is received within locking member receiving opening 46 for removably locking mounting bracket 40 to boat 10. Located on top surface 47 of body member 42 is an accessory receiving unit generally indicated as 60. As illustrated, accessory receiving unit 60 is a hexagonal structure defining an opening 62 therein, the surface of which is threaded as at 64. Moreover, accessory receiving unit 60 is secured to upper surface 47 of body member 42 as by welding at 66, though obviously unit 60 could be of unitary construction with mounting bracket 40, or otherwise secured thereto.

Locking member 50 is received within locking member receiving opening 46 for removably locking mounting bracket 40 to boat 10. In a preferred arrangement, locking member 50 includes an elongated element 52 having a curved free end 54 and an opposite threaded end 56 about which a nut 58, such as a wing nut, may be received. Though a bolt-type locking means is disclosed as a preferred embodiment, obviously other types of locking means may be employed so long as they properly interface with a portion of gunnel 14 of boat 10 in a locking mode and are conveniently removable therefrom.

In operation, making reference to all of the figures, mounting bracket 40 is locatable along gunnel 14 as desired with lip 44 received beneath caprail 18 within the confines of a chamber defined by wall 19, caprail 18 and a corresponding end 16' of rail 16. Body member 42 of mounting bracket 40 thus extends outwardly from caprail 18 over top rail 16 of gunnel 14, with end 45 of same extending downwardly with respect thereto for a distance adequate to permit locking means 50 to become engaged with an inwardly extending flange 17 that forms a part of top rail 16. Particularly, hook end 54 of locking means 50 engages flange 17 through rail 16 could be constructed otherwise with end 54 of locking means 50 configured to engage same in a locking manner. With hook 54 in engagement with flange 17 and an outer free end 55 of same located behind flange 17, wing nut 58 is tightened along threads 56 to impart tension to mounting bracket 40 adequate to lock same to gunnel 14. Obviously, with adequate tightness of locking means 50, lip 44 cannot be removed from within caprail 18 so that mounting bracket 40 is firmly secured or locked to gunnel 14. With mounting bracket 40 thus locked to gunnel 14, receiving unit 60 (see FIG. 3) is presented atop bracket 40 such that an accessory A as shown in phantom may be threadably secured thereto.

As can be seen in FIG. 3, with bracket 40 so mounted, accessory receiving unit 60 is generally vertical. Such, however, is not necessary and accessory receiving unit 20 may be inclined at an angle to better present the accessory depending upon the particular needs of same. When utilizing accessory A in the form of a lantern holder, for example, it may be more desirable to incline receiving unit 60 at an angle outwardly with respect boat 10 such that a lantern (not shown) can be suspended therefrom to be located over the water and away from the boat. Such an inclination of receiving unit 20 may be provided in one of several ways. For example, in one embodiment, receiving unit 60 could simply be secured to bracket 40 at a location such that when bracket 40 is mounted to boat 10 as shown in FIG. 3, receiving unit 60 would always be at a predetermined angle. Alternatively, a second locking receiving opening (not shown) could be provided in body member 42 for locking means 50. If locking means 50 is received within a locking member receiving opening located more centrally along body member 42, and with body member modified to accommodate same, when hook 54 is engaged behind flange 17, mounting bracket 40 could be pulled inwardly and downwardly with respect to top rail 16 to present receiving unit 60 at an angle and permitting an accessory secured thereto to extend outwardly from the boat.

Mounting brackets according to the present invention are intended for use in a marine environment including use over salt water. It is thus preferable that mounting bracket 40 be fabricated from stainless steel or other metals that are non-corrosive. Likewise, bracket 40 may be injection molded or otherwise formed from an appropriate polymeric material which likewise is inert to a corrosive environment.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. A mounting bracket for a boat, said bracket comprising an elongated, arcuate member, said member having a first end, a second end and top and bottom surfaces, one of said ends of said member defining a lip for locking receipt about a portion of a boat onto which said bracket is to be mounted, an opposite end of said member defining an opening therethrough for receipt of a locking means, said member further having means secured thereto on a top surface thereof and intermediate the length thereof for receipt of an item to be mounted to said boat; and locking means associated with said bracket for removably locking said bracket to said boat, said locking means comprising an elongated element received through said opening, said element having a curved portion at one end of same adjacent a bottom surface of said member and being threaded along at least a portion of the length thereof, and a nut threadably received about said element.

2. A mounting bracket as defined in claim 1 wherein said means for receiving an item to be mounted comprises a protuberance secured to said top surface of said member, said protuberance having a threaded opening defined therefor for threaded receipt of said item.

3. A mounting bracket as defined in claim 2 wherein said means for receiving said item is mounted at the approximate apex of said member.

4. A mounting bracket for a boat for receipt of an item for use in conjunction with said boat, said bracket comprising an elongated body member, said body member having a first end, a second end and top and bottom surfaces, said body member being generally arcuate in shape for receipt over a portion of a gunnel of a boat, one end of said body member defining a lip thereacross, said body member defining a locking means receiving opening adjacent an end of same opposite said lip; locking means received in said locking means receiving opening and extending outwardly from said top and said bottom surfaces; and item receiving means secured to said top surface of said bracket intermediate the length of same, said locking means comprising an elongated element received through said opening, said element having a curved portion at an end of same adjacent a bottom surface of said member and being threaded along at least a portion of the length thereof, and a nut threadably received about said element.

* * * * *